United States Patent [19]

Youngborg

[11] 4,302,288
[45] Nov. 24, 1981

[54] FLUID LEVEL CONTROL SYSTEM

[75] Inventor: Lamont H. Youngborg, San Jose, Calif.

[73] Assignee: General Electric Company, San Jose, Calif.

[21] Appl. No.: 953,436

[22] Filed: Oct. 23, 1978

[51] Int. Cl.[2] .............................................. G21C 7/00
[52] U.S. Cl. ..................................... 376/210; 376/258
[58] Field of Search ................. 176/19 R, 20, 22, 24, 176/54–56, 19 EC, 19 J; 364/119, 492, 494, 502

[56] References Cited

U.S. PATENT DOCUMENTS

| | | | |
|---|---|---|---|
| 3,689,802 | 9/1972 | Waldman | 176/19 EC |
| 3,895,223 | 7/1975 | Neuner et al. | 176/19 EC |
| 3,979,255 | 9/1976 | Bulgier et al. | 176/20 R |
| 4,061,533 | 12/1977 | Durrant | 176/20 R |
| 4,104,117 | 8/1978 | Parziale et al. | 176/20 R |

Primary Examiner—S. A. Cangialosi
Attorney, Agent, or Firm—Ivor J. James, Jr.; Samuel E. Turner; Sam E. Laub

[57] ABSTRACT

In a system, such as a water-cooled nuclear reactor, water level sensors provide signals to a control channel for control of feedwater flow and hence the water level in the pressure vessel. Rapid and fine level control is provided by comparing fluid outflow and inflow. Means are provided to block automatically the flow comparison signal from the control circuit in response to a signal characteristic of a faulted flow comparison signal. At least one redundant control channel is provided and level control is transferred thereto automatically upon excusion of the water level beyond predetermined normal upper and lower limits or in response to a rapid change in the water level control signal to avoid unnecessary shutdown in the event of a faulted channel.

14 Claims, 4 Drawing Figures

FLUID LEVEL CONTROL SYSTEM

BACKGROUND

The invention relates to a system for controlling the fluid level in a vessel. Among numerous applications for such a system is the maintenance of the water level in a nuclear reactor.

In well-known commercial boiling water nuclear power reactors, for example as used in the Dresden Nuclear Power Station near Chicago, Ill., a core of fuel material contained in a pressure vessel is submerged in a fluid, such as light water, which serves both as a working fluid and a neutron moderator.

The water is circulated through the core whereby a portion thereof is converted to steam. The steam is taken from the pressure vessel and applied to a prime mover such as a turbine. The turbine exhaust steam is condensed and, along with any necessary make-up water, returned to the pressure vessel as feedwater. Reactor power level is controlled by a system of control rods, containing neutron absorber material, which are selectively insertable into the core. Further information on nuclear reactors may be found, for example, in "Nuclear Power Engineering", N. M. El-Wakil, McGraw-Hill Book Company, Inc., 1962.

Nuclear reactors are provided with a protection system which monitors various aspects of reactor operation including water level. If a fault develops in the water level control system and it fails to maintain a predetermined water level in the vessel, the water level becomes "out of limits", either too high or too low, and the protection system "scrams" the reactor that is, it causes rapid insertion of the control rods whereby the reactor is shut down automatically. Such reactor shutdowns are undesirable for a variety of reasons. Even if the fault is corrected readily, restart of the reactor is a relatively lengthy process. Meanwhile, customers may suffer a loss of power or the power must be supplied from other, usually more costly, sources.

Thus an object of the invention is an improved liquid level control system which is tolerant of a failure of components therein. Another object is a level control system having redundant control channels with means for switching control automatically to another channel upon an excursion of the liquid level beyond prescribed limits.

SUMMARY

These and other objects are achieved, according to the invention, by providing at least one rudundant channel for control of the flow of feedwater to the vessel. A plurality of water level sensors are positioned on the vessel at the positions of normal operating water level upper and lower limits. When a majority of the upper or lower limit sensors indicate an excursion of the water level beyond a limit, feedwater flow control is switched automatically from the initial control channel to a redundant control channel whereby a component failure in the initial channel does not result in a reactor scram. Means are also provided to switch control immediately to the redundant channel in response to a rapid change in the water level control signal of the initial channel.

Another aspect of the feedwater flow control system is detection of the steam outflow and feedwater inflow flow rates. In normal operation feedwater flow is controlled in accordance with the vessel water level and the difference between the water equivalent of the steam flow and the feedwater flow. In such a system, component failure usually is manifested by a rapid change in the difference signal. Thus in accordance with the invention a rapid change in the difference signal causes the steam and feedwater flow aspect of water level control to be switched out of the circuit, control thereupon being assumed solely by the water level sensor arrangement without causing a reactor scram.

DRAWING

DESCRIPTION

Figure 1:
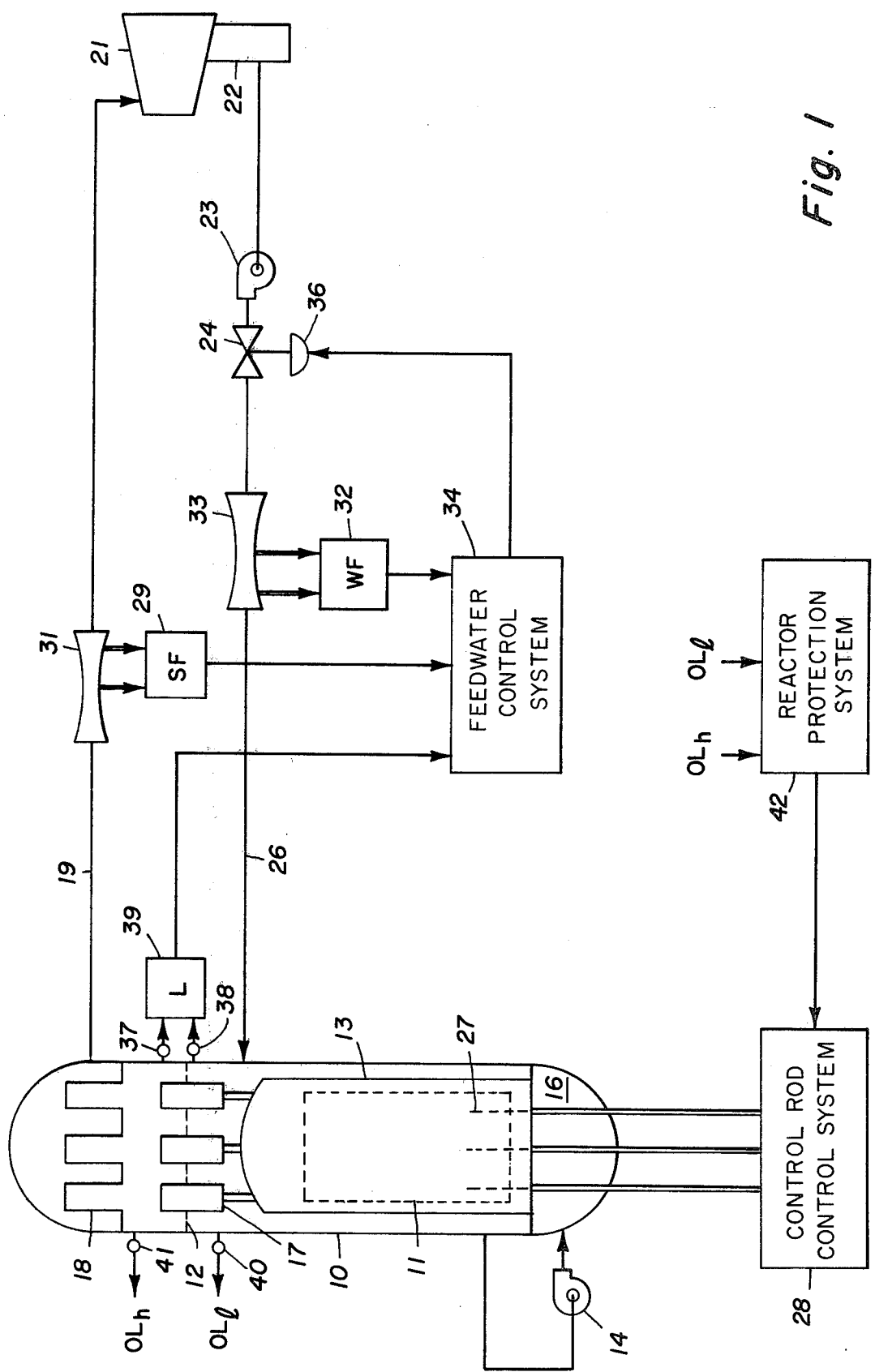
FIG. 1 is a schematic illustration of nuclear reactor and water level control system.

The invention is described herein as employed in a water cooled and moderated nuclear reactor of the boiling water type, an example of which is illustrated in simplified schematic form in FIG. 1. Such a reactor system includes a pressure vessel 10 containing a nuclear fuel core 11 submerged in a coolant-moderator such as light water, the normal water level being indicated at 12.

A shroud 13 surrounds the core 11 and a coolant circulation pump 14 pressurizes a lower chamber 16 from which coolant is forced upward through the core 11. A part of the water coolant is converted to steam which passes through separators 17 and dryers 18 thence through a steam line 19 to a utilization device such as a turbine 21. Condensate formed in a condenser 22, along with any necessary make-up water, is returned as feedwater to the vessel 10 by a pump 23 through a control valve 24 and a feedwater line 26.

A plurality of control rods 27, containing neutron absorber material, are provided to control the level of power generation and to shut down the reactor when necessary. Such control rods 27 are selectively insertable among the fuel assemblies of the core under control of a control rod control system 28.

For proper reactor operation it is necessary to maintain the water level in vessel 10 within predetermined upper and lower limits. A general approach to such water level control will now be discussed. A first aspect of such control is a comparison between the steam outflow from the vessel with the feedwater in-flow.

A signal proportioned to the steam flow rate is provided by a steam flow sensor which may be a well-known differential pressure transmitter 29 that senses the differential pressure from a pair of spaced pressure taps in a venturi 31 placed in the steam line 19. (A suitable venturi arrangement for such purpose is shown in U.S. Pat. No. 3,859,853.)

Similarly, a signal proportional to the feedwater flow rate is provided by a sensor 32 which may be in the form of a differential pressure transmitter connected to a venturi 33 in the feedwater line 26. (A suitable venturi for use in the feedwater line is shown in U.S. Pat. No. 3,889,537.)

The signals from flow sensors 29 and 32 are transmitted to a feedwater control system 34 wherein one is subtracted from the other. A difference of zero indicates that outflow and inflow are the same and the water level will remain constant. If the difference is other than zero, a signal corresponding in sign and proportional to the amplitude of the difference is applied to a valve controller 36 which adjusts the valve 24 in a manner to bring steam outflow and feedwater inflow toward balance. This arrangement provides rapid correction and maintains vessel water level within the bounds of a relatively narrow deadband. However, it does not sense or control the position of the water level in the vessel.

Thus a second aspect of water level control is the provision of an upper water level pressure tap 37 and a lower water level pressure tap 38 which provide signals from which the position of the water level in the vessel may be determined. The pressure taps 37 and 38 communicate with the interior of the vessel 10 and are connected to a well-known differential pressure transmitter 39 which converts the difference in pressure at taps 37 and 38 to an output signal indicative of the position of the water level 12. This signal is applied to the feedwater control system 34 and is employed therein to modify the control signal to valve controller 36 whereby the valve 24 is controlled to maintain the position of the water level 12 within the prescribed upper and lower normal operating limits. (Although not shown here for clarity of drawing, it is noted that the usual system employs two or more sets of pumps 23, valves 24 and controllers 36 connected in parallel.)

If for some reason, such as component failure, the feedwater control system 34 fails to maintain the water level within normal limits the water level may become excessively low or high. A level detector 40 is provided to detect an excessively low, out-of-limits, water level and to produce a signal $\theta L_l$. Similarly, a level detector 41 is provided to detect an excessively high water level and to produce a signal $\theta L_h$. These signals are received by a reactor protection system 42 which responds to an out-of-limits condition by signaling the control rod control system 28 to insert the control rods and shut down the reactor.

Figure 2:
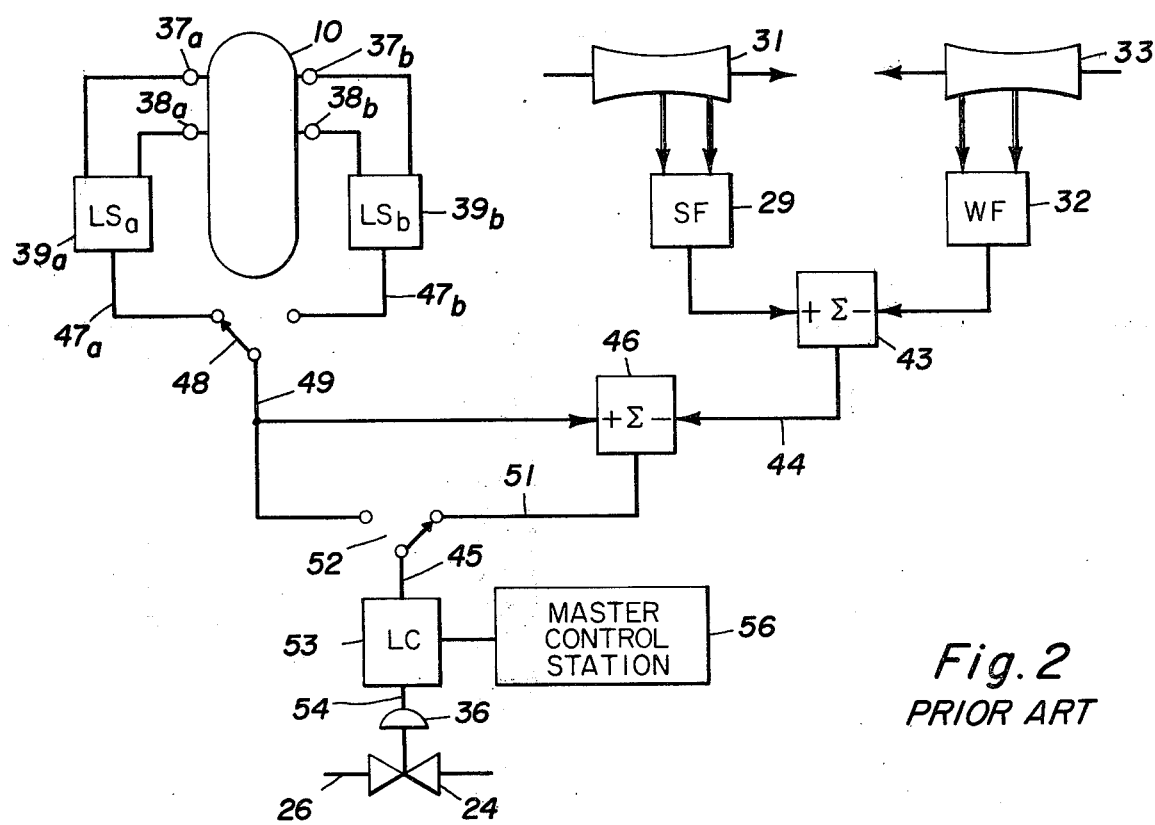
FIG. 2 is a schematic illustration of a prior water level control system.

As further background to a discussion of the present invention reference is made to FIG. 2 which illustrates a known prior water level control system.

As in FIG. 1, signals proportional to the steam flow rate and feedwater flow rate are provided by differential pressure transmitters 29 and 32. These signals are applied to separate inputs of a first algebraic summer circuit 43 which provides an output signal proportional to the difference therebetween on a lead 44 connect to an input of a second summer circuit 46.

Signals indicative of the water level in vessel 10 are provided on respective leads $47_a$, $47_b$ from differential pressure transmitters $39_a$ and $39_b$ which are connected to suitably positioned differential pressure sensors. A switch 48 selects either the signal on lead $47_a$ or lead $47_b$ at the option of the reactor operator and the selected signal normally is applied over a lead 49 to a second input of summer circuit 46.

The output signal of the summer circuit 46 is applied over a lead 51, a switch 52 and a lead 45 to a level control circuit 53. The control circuit 53 compares the signal from the summer circuit to level set points and applies a level correction signal over a lead 54 to the controller 36 of valve 24 in the feedwater line 26 whereby the valve 24 is controlled as described hereinbefore in connection with FIG. 1.

The switch 52 allows the operator to connect the line 49 directly to level controller 53 so that the summer 46 is out of the circuit.

A master control station 56, located at the operators position and connected to the level controller 53 provides suitable operator displays, allows operator adjustment of the water level set points and provides for manual control of the valve controller 36.

Thus the prior system, illustrated in FIG. 2 allows manual selection of one or the other of the water level indicating signals on leads $47_a$ and $47_b$ and the switch 53 allows the steam and feedwater flow comparison arrangement to be switched out of the circuit. However, there is no means for taking action automatically in the event of faults.

Figure 3:
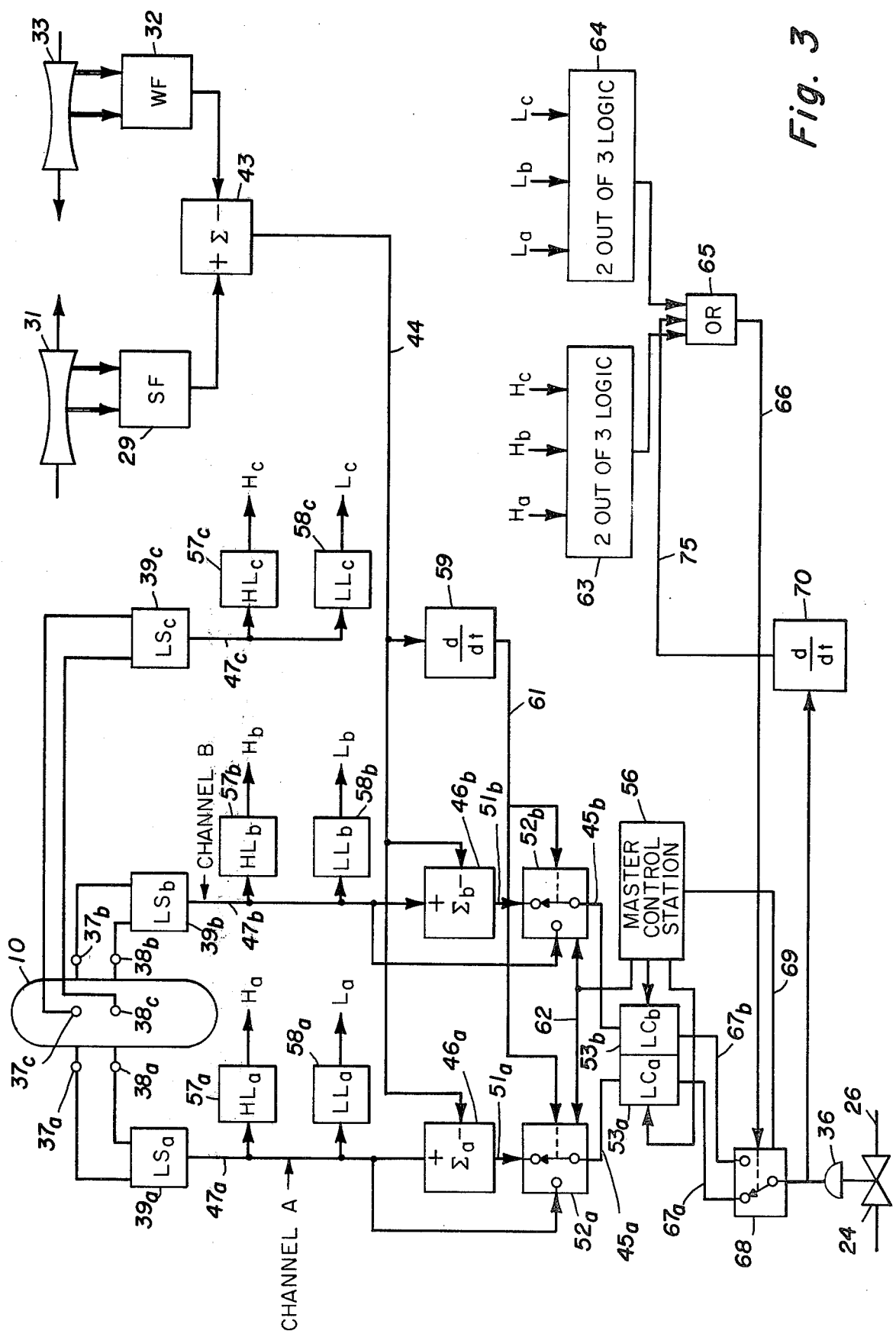
FIG. 3 is a schematic illustration of a water level control system according to the invention.

A water level control system according to the invention, which reduces the liklihood of reactor shutdown because of failure of a component of the system, is illustrated in FIG. 3. Features which distinguish this system from previous systems are the provision of at least one redundant level control channel, automatic transfer of control from one channel to another and automatic disconnect of the signal from the steam and feedwater flow comparison circuit.

For the purpose of this discussion Channel A will be considered the normal control channel and Channel B the redundant channel. Channel A includes the following interconnected elements: pressure taps or sensors $37_a$ and $38_a$, differential pressure transmitter $39_a$, high level trip circuit $57_a$, low level trip circuit $58_a$, summer circuit $46_a$, switching circuit $52_a$, and level control circuit $53_a$. Channel B includes similar interconnected elements with similar reference numbers but with b subscripts.

Differential pressure transmitter $39_a$ provides an output signal indicative of the water level in vessel 10. This signal is applied to an input of summer circuit $46_a$ via lead $47_a$. The other input of summer circuit $46_a$ is connected to lead 44 over which is transmitted the output signal of summer circuit 43 which, as described hereinbefore is proportional to the difference between steam outflow and feedwater inflow whereby the level indicating signal is modified by the flow difference signal. The output signal from summer circuit $46_a$ normally is applied via lead $51_a$, switch $52_a$ and lead $45_a$ to the level control circuit $53_a$. Control circuit $53_a$ provides the water level control signal on a lead $67_a$ which normally is applied through a switch 68 to valve controller 36. Operation of channel B is similar with the output signal of summer circuit $46_b$ normally being applied to level control circuit $53_b$.

A feature of the invention is the provision of a rate of change circuit 59 which monitors the flow rate difference signal on lead 44 and actuates switches $52_a$ and $52_b$ in response to a predetermined rate of change in the difference signal. It is found that component failures tend to be catastrophic in nature. Thus such a failure in the steam-feedwater flow comparison circuit (e.g. elements 29,32,43) is likely to result in a high rate of change of the output signal of summer circuit 43 on lead 44. Such a rate of change is detected by circuit 59 which thereupon produces an output signal on a lead 61 which actuates switches $52_a$ and $52_b$ to connect the leads $47_a$ and $47_b$ directly to leads $45_a$ and $45_b$, respectively, and thus the summer circuits $46_a$ and $46_b$ are bypassed. (A signal connection 62 from the master control station 56 provides for manual reset of the switches $52_a$ and $52_b$.)

Another feature of the invention is the transfer of water level control from Channel A to Channel B upon detection that the water level has drifted outside of upper or lower operating limits or upon detection of a rapid change in the water level control signal from control circuit $53_a$.

To detect the event of water level drift outside of the predetermined limits, the water level signals from three separate differential pressure transmitters $39_a$, $39_b$ and $39_c$ are monitored. The differential pressure transmitter $39_c$ can be connected to suitable pressure sensors $37_c$ and $38_c$ or it can be connected in parallel with transmitter $39_b$ to pressure sensors $37_b$ and $38_b$.

Connected to monitor the water level signals on leads $47_a$, $47_b$ and $47_c$ from transmitters $39_a$, $39_b$ and $39_c$ are respective pairs of high and low level trip circuits including $57_a$ and $58_a$ connected to lead $47_a$, $57_b$ and $58_b$ connected to lead $47_b$ and $57_c$ and $58_c$ connected to $47_c$. (The level trip circuits may be any well-known threshold circuit, such as a Schmitt trigger circuit, which produces an output signal only when the input signal exceeds, or falls below, a predetermined level.)

The high level trip signals $H_a$, $H_b$ and $H_c$ are applied to a 2-out-of-3 logic circuit 63. Similarly, the low level trip signals $L_a$, $L_b$ and $L_c$ are applied to a similar logic circuit 64. The output signals from the logic circuit are fed to an OR circuit 65. Thus in response to the presence of any two of the high level or any two of the low level trip signals the OR gate 65 produces an output channel transfer signal on a lead 66 connected to the transfer switch 68.

In its normal position, the transfer switch 68 connects the level control circuit $53_a$ through lead $67_a$ to the valve controller 36 for control of the feedwater flow control valve 24 by Channel A.

A channel transfer signal from OR gate 65 on lead 66 actuates transfer switch 68 to connect level control circuit $53_b$, through lead $67_b$, to valve controller 36 whereby water level control is transferred to Channel B. (A connection 69 between switch 68 and the master control station 56 provides reset of the switch 68. It is to be understood that connections, not shown, provide visual indications at the operators station of various aspects of circuit operation, such as the states of switches $52_a$, $52_b$, and 68.)

If a failure in Channel A causes a high rate of change in the water level control signal on lead $67_a$ which results in a large change in feedwater flow to the vessel through valve 24, the capacity of the feedwater source (e.g. condenser 22, FIG. 1) to store or supply the feedwater may be exceeded before the change in water level is sufficient to produce the low level or high level trip signals necessary to transfer control to Channel B.

To prevent such a possibility, a further feature of the invention is the provision of a rate of change detection circuit 70 connected to monitor the water level control signal to valve controller 36. In response to a high rate of change of this control signal the rate of change circuit produces an output signal on a lead 75 connected to an input of the OR gate 65. In response to such signal the OR gate 65 provides an output signal on lead 66 which actuates switch 68 whereby water level control is transferred immediately to Channel B.

In the system illustrated herein the rate of feedwater flow is varied by valve 24. Other feedwater flow rate varying means may be used. For example, the feedwater flow can be varied by use of a variable speed drive for pump 23. In such case the valve 24 is eliminated and the flow control signal is applied to a speed controller of the variable speed drive (not shown) for pump 23.

If control is transferred to Channel B because of a rapid change in the water level control signal of Channel A, there is no significant change in the vessel water level because of the immediacy of the transfer, for slow changes in vessel water level, transfer of control is not effected until the predetermined upper or lower operating limits are exceeded.

Figure 4:
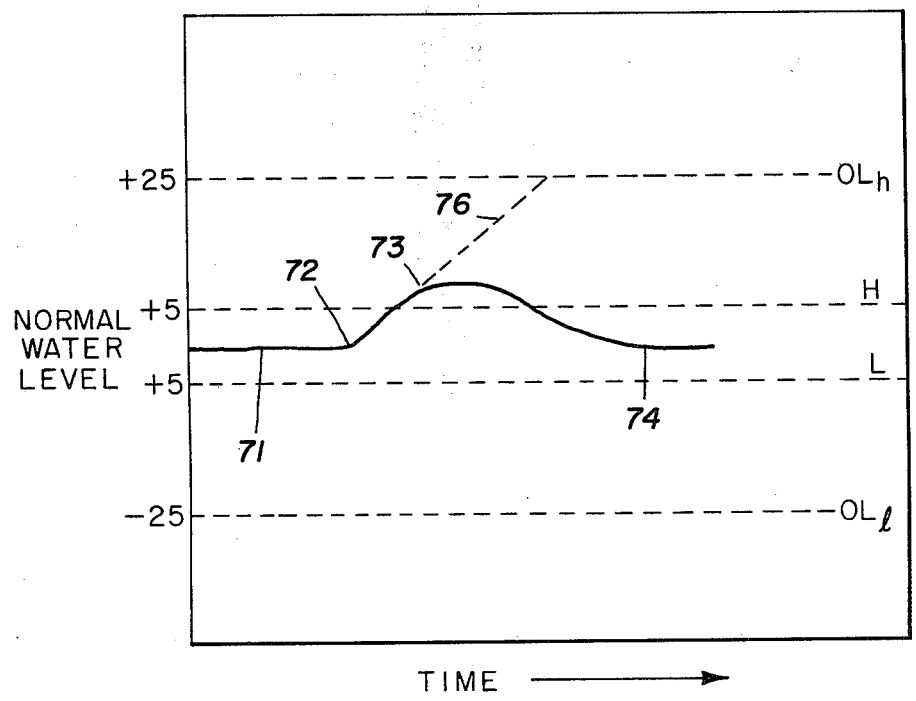
FIG. 4 shows a water level curve illustrating operation of the system of FIG. 3.

An example of the operation of the water level control system of FIG. 3 for a slowly changing water level is illustrated by FIG. 4. The initial portion 71 of the curve illustrates normal level control operation under control of Channel A. At 72 it is assumed that a fault occurs in Channel A which results in a relatively slowly rising water level. At 73 the water level traverses the normal upper limit H.

This event is detected by the high level trip circuits $57_a$–$57_c$ which thereupon produce at least two of the signals $H_a$, $H_b$ and $H_c$. In response to these signals the logic circuit 63 produces an output signal through OR gate 65 which actuates switch 68 and, thus automatically transfers level control to Channel B. Upon assuming control, Channel B reduces the water level to its normal position as indicated at 74. (Transfer of level control from Channel A to Channel B could cause a large change in feedwater flow if the water level set point of level control circuit $53_b$ is significantly different from the actual vessel water level when the transfer is made. To prevent such a large change in feedwater flow the level set point established by control circuit $53_b$ preferably is floating, rather than fixed, so that it tracks the actual vessel water level within the upper and lower operating limits, or other means may be provided to limit the rate of change of the water level control signal.

In the absence of the automatic control channel transfer provided by the present invention (for example, with a prior system as shown in FIG. 2) the water level could continue to rise, as indicated by the dashed curve 76, until it reached the upper out of limits level $OL_h$ and the reactor would have been shut down unnecessarily.

Studies of the operation and reactor scram history of a large nuclear reactor power plant indicate that use of the present invention in such plant will reduce the annual reactor scrams by about 6 percent with an annual savings in the cost of the unavailability of the reactor of several hundred thousand dollars per year.

I claim:

1. In a system having a fluid-filled vessel with fluid outflow means including an outflow line for removing fluid from said vessel and fluid inflow means, including an inflow line and inflow rate control means therein, for injecting fluid into said vessel, a fluid inflow control system for maintaining the fluid level in said vessel between predetermined upper and lower limits comprising: first and second fluid level control channels each including means for sensing the fluid level in said vessel and for developing a control signal indicative of the position of said fluid level; means normally operative to apply the control signal of the first control channel to said inflow rate control means whereby the fluid inflow rate is varied to maintain said fluid level within said upper and lower limits; a plurality of fluid level monitoring means each normally producing indications in the event that said fluid level reaches said upper or lower limits; and means operative in response to said indications from a majority of said fluid level monitoring means for disconnecting the control signal of said first control channel from said inflow rate control means and for applying the control signal of said second control channel thereto whereby control of fluid level in said vessel is transferred automatically to said second channel upon failure of said first channel to maintain said fluid level within said upper and lower limits.

2. The system of claim 1 further including means providing a difference signal indicative of the difference between fluid outflow and inflow flow rates, and means for modifying the control signals of each of said channels in response to said difference signal to thereby provide rapid and fine control of the fluid level in said vessel.

3. The system of claim 2 further including means for monitoring the rate of change of said difference signal and responsive to a predetermined rate of change of said difference signal for automatically disconnecting said difference signal from said control channels.

4. The system of claim 1 further including means for monitoring the rate of change of the control signal of said first channel and responsive to a predetermined rate of change of said control signal of said first channel for automatically transferring vessel fluid level control to said second channel.

5. In a water-cooled nuclear reactor with a nuclear fuel core submerged in water within a pressure vessel and having an output line for taking heated water from said vessel and a feedwater line, including feedwater flow rate control means, for injecting water into said vessel, a feedwater flow control system for maintaining the water level in said vessel between predetermined upper and lower limits comprising: first and second water level control channels each including means connected to said vessel for sensing the water level therein and for developing a level correction signal proportional to the difference between the sensed water level and a predetermined water level; means normally operative to apply the level correction signal of said first channel to said feedwater flow rate control means whereby said feedwater flow rate is adjusted to change the water level toward said predetermined level; a plurality of water level monitoring means connected to receive indication of the water level in said vessel for producing separate upper and lower limit signals in the event said water level reaches said upper limit or drops to said lower limit; logic means connected to receive said limit signals and operative to produce a channel transfer signal upon receipt of upper or lower limit signals from a majority of said water level monitoring means; and a channel transfer switch responsive to said channel transfer signal for disconnecting said first channel from said feedwater flow rate control means and for applying the level correction signal of said second channel to said feedwater flow rate control means.

6. The system of claim 5 further including means providing a difference signal proportional to the difference between the water flow rates through said output and feedwater lines and means for modifying the level correction signals in each of said channels in response to said difference signal.

7. The system of claim 6 further including means for monitoring the rate of change of said difference signal and responsive to a predetermined rapid rate of change of said difference signal for automatically disconnecting said difference signal from said control channels.

8. The system of claim 5 including means responsive to a predetermined rate of change of the level correction signal of said first channel for disconnecting said first channel from said feedwater flow rate control means and for applying the level correction signal of said second channel thereto.

9. In a boiling water nuclear reactor with a nuclear full core submerged in water within a pressure vessel and having a steam outflow line for applying steam to a utilization device and a feedwater inflow line, including feedwater inflow rate control means therein, for injecting water into said vessel, a feedwater flow control system for maintaining the water level in said vessel between predetermined upper and lower limits comprising: first flow rate sensing means connected to said steam line providing a steam flow rate signal proportional to the steam flow rate in said steam line; second flow rate sensing means connected to said feedwater line providing a feedwater flow rate signal proportional to the feedwater flow rate in said feedwater line; a flow rate summer circuit connected to receive said steam flow rate and feedwater flow rate signals and responsive thereto to produce a flow rate difference signal proportional to the difference between the water-equivalent steam outflow rate and the feedwater inflow rate; first and second water level control channels each including: water level sensing means including upper and lower sensors connected to said vessel providing a water level position signal indicative of the position of the water level in said vessel, a level signal summer circuit connected to receive said water level position signal at a first input thereof, means for applying said flow rate difference signal to a second input of the level signal summer circuit of each channel whereby said level signal summer circuit produces a modified level position signal proportional to the difference between said level position signal and said flow rate difference signal, a level control circuit for normally receiving said modified level position signal for comparing it to a predetermined level set point and for producing a level correction output signal, a level signal switching circuit operative in a normal first position to connect the output of said level signal summer circuit to the input of said level control circuit for normally applying said modified level position signal to said level control circuit, said switching circuit being operative in a second position to disconnect said level signal summer circuit and to connect the output of said water level sensing means to the input of said level control circuit whereby said level position signal is applied directly thereto; rate of change detection means connected to receive said flow rate difference signal and responsive to a predetermined rapid rate of change thereof to apply a switch actuating output signal to said level signal switching circuit whereby said level signal switching circuit is placed in said second position thereof; a controller for said feedwater inflow rate control means for adjusting said control means in response to said level correction signal; a level correction signal switching circuit operative in a normal first position to transmit the level correction signal from the level control circuit of said first channel to said controller and operative in a second position alternatively to transmit the level correction signal from the level control circuit of said second channel to said controller; at least three water level monitoring means each normally producing separate upper and lower limit signals in the event that the water level in said vessel rises to said upper limit or drops to said lower limit; a logic circuit connected to receive said limit signals and responsive to the occurrence of at least two upper or at least two lower limit signals from said level monitoring means for applying a switch actuating signal to said level correction signal switching circuit whereby said level correction signal switching circuit is placed in said second position thereof to thereby transmit the level correction signal from the level control circuit of said second channel to said controller.

10. In a system having a fluid-filled vessel with fluid outflow means, including an outflow line, for removing fluid from said vessel and fluid inflow means, including an inflow line and inflow rate control means therein, for injecting fluid into said vessel, a method for maintaining the fluid level in said vessel between predetermined upper and lower limits comprising the steps of:

(1) providing first and second fluid level control channels each including means for sensing the fluid level in said vessel and for developing a fluid level control signal indicative of the position of said fluid level in said vessel;

(2) normally applying the fluid level control signal of the first control channel to said inflow rate control means whereby the fluid inflow rate is varied to maintain said fluid level within said upper and lower limits;

(3) providing a plurality of fluid level monitoring means each normally producing separate indications in the event that said fluid level reaches said upper or lower limits;

(4) applying said indications to a majority sensing logic means which is responsive to said indications from a majority of said fluid level monitoring means for disconnecting the control signal of said first control channel from said inflow rate control means and for applying the control signal of said second channel thereto whereby control of the fluid level in said vessel is transferred automatically to said second channel upon failure of said first channel to maintain said fluid level within said upper and lower limits.

11. The method of claim 10 including the further steps of providing means for producing a difference signal indicative of the difference between fluid outflow and fluid inflow rates and modifying the control signals of each of said channels in response to said difference signal to thereby provide rapid control of the fluid level in said vessel.

12. The method of claim 11 including the further steps of monitoring the rate of change of said difference signal and automatically disconnecting said difference signal from said control channels in response to a predetermined rate of change of said difference signal.

13. The method of claim 10 including the step of monitoring the rate of change of the fluid level control signal of said first control channel and automatically transferring control of the fluid level in said vessel to said second channel upon detection of a rate of change of the fluid level control signal of said first channel greater than a predetermined rate.

14. In a system having a fluid-filled vessel with fluid outflow means including an outflow line, for removing fluid from said vessel and fluid inflow means including an inflow line and inflow rate control means therein, for injecting fluid into said vessel, a fluid inflow control system for maintaining the fluid level in said vessel between predetermined upper and lower limits comprising: first and second fluid level control channels each including means for sensing the fluid level in said vessel and for developing a control signal indicative of the position of said fluid level; channel transfer means normally operative to apply the control signal of the first control channel to said inflow rate control means whereby the fluid inflow rate is varied to maintain said fluid level within said upper and lower limits, said channel transfer means being operative when actuated to disconnect said first control channel from said inflow rate control means and to apply the control signal of said second control channel to said inflow rate control means; a rate of change sensing device connected to monitor said control signal of said first channel and responsive to a rate of change thereof greater than a predetermined rate for producing a channel transfer signal; and means for applying said channel transfer signal to said channel transfer means for actuation thereof.

* * * * *